United States Patent [19]
Weissman

[11] Patent Number: 5,628,226
[45] Date of Patent: May 13, 1997

[54] AMPLIFIED TOGGLE PRESS FOR RULE BENDING AND NOTCHING

[75] Inventor: Andrew J. Weissman, Glenview, Ill.

[73] Assignee: J. F. Helmold & Bros., Inc., Elk Grove, Ill.

[21] Appl. No.: 430,561

[22] Filed: Apr. 28, 1995

[51] Int. Cl.⁶ .................. B21J 9/18; B21D 7/06
[52] U.S. Cl. .................. 72/451; 72/479; 100/281
[58] Field of Search ............ 72/450, 451, 479; 100/281, 282

[56] References Cited

U.S. PATENT DOCUMENTS

| | | | |
|---|---|---|---|
| 2,277,360 | 3/1942 | Wagner | 72/451 |
| 2,879,826 | 3/1959 | Balsam | 72/451 |
| 3,837,211 | 9/1974 | Gress et al. | 72/451 |
| 3,859,838 | 1/1975 | Karsnak | 72/10 |
| 4,301,723 | 11/1981 | Borzym | 100/83 |
| 4,449,421 | 5/1984 | Olschewski et al. | 72/450 |
| 4,916,932 | 4/1990 | Obrecht et al. | 72/451 |
| 4,918,815 | 4/1990 | Juros . | |
| 4,959,989 | 10/1990 | Obrecht et al. | 72/100 |
| 5,477,725 | 12/1995 | Muller | 72/450 |

FOREIGN PATENT DOCUMENTS

| | | | |
|---|---|---|---|
| 634760 | 2/1983 | Switzerland | 72/451 |
| 982439 | 2/1965 | United Kingdom | 72/451 |

*Primary Examiner*—David Jones
*Attorney, Agent, or Firm*—O'Connor Cavanagh; John D. Titus

[57] ABSTRACT

A manually-operated rule bending and notching press producing a ram output mechanical advantage that is substantially than prior art manual rule bending and notching presses. This is accomplished by providing a toggle linkage that drives a crank-and-pivot mechanism. The input handle is able to travel through at least about 100 to 180 degrees of rotation as the ram moves through its full travel, however, the handle still moves through the most usable 90 degrees of rotation while the ram is moving through the most highly loaded final ½ to ¾ inch of its stroke. The crank and pivot mechanism provides a substantially linear force multiplication during this last part of the press ram stroke because the crank does not pass or near the top dead center of either the input or the output linkage. Accordingly, variations in output mechanical advantage may be effected simply by altering the radii of the input and output crank pivots.

6 Claims, 6 Drawing Sheets

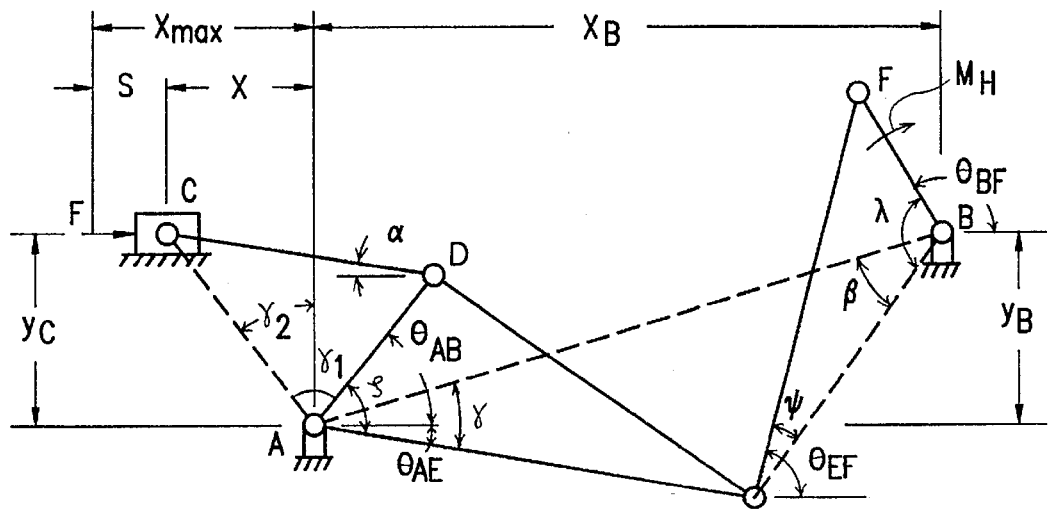
FIG. 4A
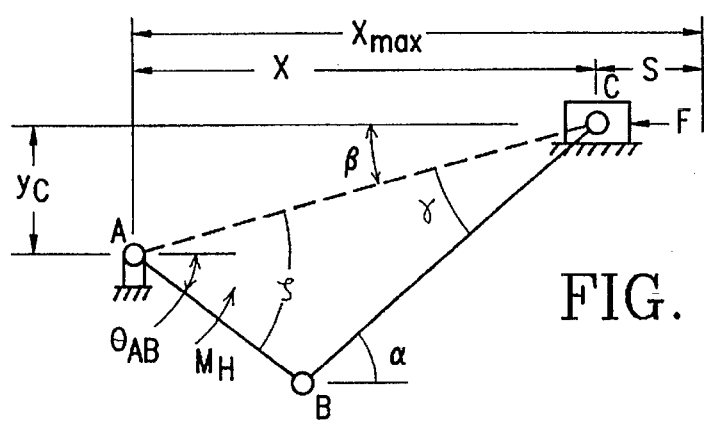
FIG. 4B
FIG. 4C
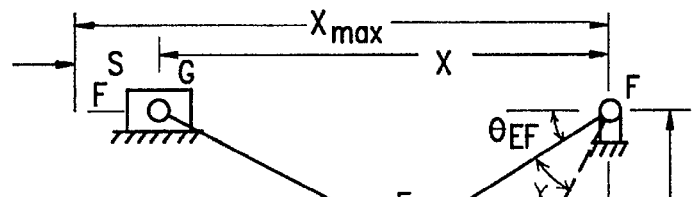
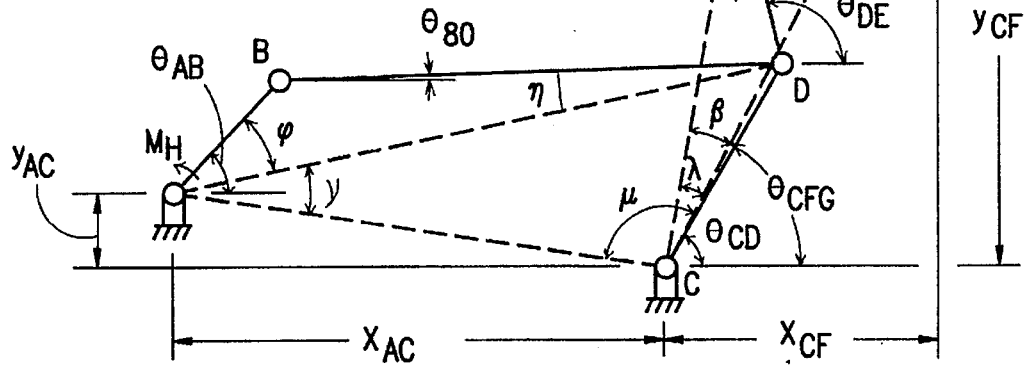

AMPLIFIED TOGGLE PRESS FOR RULE BENDING AND NOTCHING

BACKGROUND OF THE INVENTION

This invention relates to presses, more particularly for manually-operated presses adapted for use in bending, shearing, and notching thin metal workpieces, such as the thin metal creasing, cutting, or perforating rule used in the box manufacturing industry.

Manually-operated presses have been in existence for over a century for use in a wide variety of fabrication processes. Although hydraulic or other power-assisted presses have replaced manually-operated presses for heavy fabrication operations, manually-operated presses are still the most economical choice for fabrication of relatively thin or soft materials. Where the fabrication process requires a relatively constant force, especially over a relatively long stroke, a simple arbor press is frequently used. Where the fabrication process requires greater force multiplication than possible with an arbor press, a press incorporating some sort of toggle mechanism is frequently employed. A toggle mechanism generates an output force proportional to the reciprocal of the sine of the angle measured between the toggle links and the line of action of the output force. Accordingly, the theoretical output of a toggle mechanism asymptotically approaches infinity as the toggle links approach a straight line. This makes a toggle-actuated press ideal for shearing or cutting workpieces having thin cross-sections because all of the work is done near the end of the stroke when the toggle link angles approach zero and the mechanical advantage is highest. Accordingly, toggle link actuated presses are the preferred embodiment for use in bending and notching the thin metal rule used in the box manufacturing industry. Typical rule bending and notching presses, such as shown in FIG. 1 marked "prior art" are modestly-sized table-mounted presses with horizontal rams and an operating handle projecting generally horizontally to allow a single operator to manipulate the workpiece and operate the press simultaneously.

Use of a toggle mechanism in the design of a press, however, generally requires trade-offs between stroke and mechanical advantage. If a toggle mechanism is used for shearing thicker materials, or for bending operations, where the ram of the press must perform work over a longer distance, operator fatigue is a problem because the mechanical advantage of a toggle-actuated press drops off rapidly as the toggle link angles increase. Cam actuated presses can be made with a cam profile tailored to provide an elevated force over a longer stroke, however, cam actuated presses require a secondary mechanism to retract the ram, which adds to the cost and complexity and may induce hysteresis between the advancement and retraction of the press ram, thereby detracting from the operator's ability to "feel" the motion of the ram. In a typical rule notching press, the stroke of the ram is on the order of 1 to 1½ inches. Most of this stroke, however, is solely to allow the dies and knives to be exchanged within the apparatus. The press typically operates in a loaded condition for only about the last 0.100 inch of its stroke. Likewise, rule bending presses typically have a stroke of about 1 to 1.5 inches to accommodated exchanging of dies, however, they typically operate under load for only about the last ½ inch of the stroke. Notwithstanding that the loaded stroke of most rule bending and notching presses are less than ½ inch, prior art presses are universally designed with a handle stroke of less than about 90°, presumably to allow the operator to apply his or her full weight on the handle throughout the full stroke of the ram. Unfortunately, this arrangement limits the maximum mechanical advantage that can be achieved at the end of the stroke, where it is most important. Additionally, prior art rule bending and notching presses generally have fixed dimensions for the linkages and, therefore, cannot easily be adjusted to provide greater or lesser mechanical advantage as needed. What is needed then is a toggle-actuated rule bending or notching press that develops a high output force concentrated over the last 0.100 to ½ inch of the stroke, without loss of operating convenience attributable to providing a 1 to 1½ inch total stroke. What is also needed is a hand-operated press that has an easily adjustable and predictable mechanical advantage.

SUMMARY OF THE INVENTION

The manually-operated rule bending and notching press according to the present invention satisfies the foregoing needs by producing a ram output mechanical advantage that is substantially higher than prior art manual rule bending and notching presses. This is accomplished by providing toggle linkage that drives a crank-and-pivot mechanism. The input handle is able to travel through at least about 100° to 180° of rotation as the ram moves through its full travel, however, the handle still moves through the most useable 90° of rotation while the ram is moving through the most highly loaded final ½ to ¾ inch of its stroke. The crank and pivot mechanism provides a substantially linear force multiplication during this last part of the press ram stroke because the crank does not pass through or near the top dead center of either the input or the output linkage. Accordingly, variations in output mechanical advantage may be effected simply by altering the radii of the input and output crank pivots.

BRIEF DESCRIPTION OF THE DRAWINGS

The above and other objects, aspects, features and attendant advantages of the present invention will become apparent from a consideration of the ensuing detailed description of presently preferred embodiments and methods thereof, taken in conjunction with the accompanying drawings, in which:

FIG. 4A–C are diagrams of the major elements of an embodiment of the present invention and those of the prior art benders of FIGS. 1 and 2, respectively.

DESCRIPTION OF PREFERRED EMBODIMENTS

Figure 1:
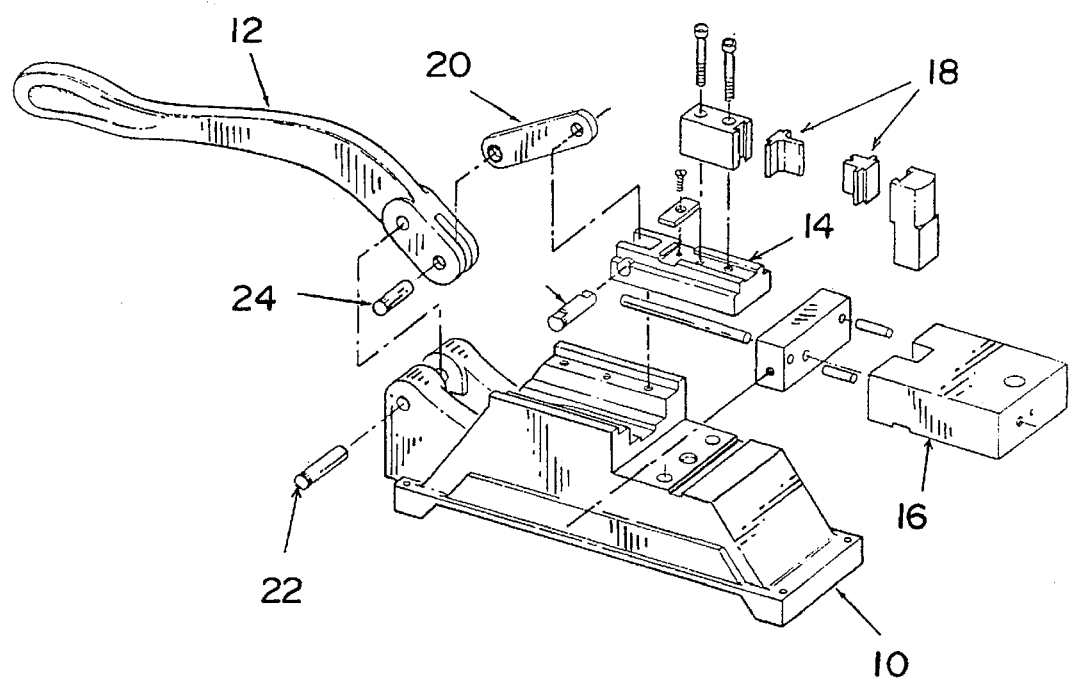
FIG. 1 is an exploded view of a prior art rule bender.

FIG. 1 is an exploded view of a prior art rule bender. The rule bender is typically about 18 inches long by about 4 inches wide and is adapted for mounting on a work table for stability and convenience of operation. The prior art rule bender comprises base 10, handle 12, ram 14 and platen 16. Interchangeable dies 18 are fixed to ram 14 and platen 16 for bending a workpiece therebetween. The force amplification mechanism of the prior art bender comprises a simple toggle mechanism in which handle 12 comprises one link and toggle link 20 comprises the second toggle link. Handle 12 is pivotally attached to base 10 by pin 22. Toggle link 20 is, in turn, pivotally attached to an extension of handle 12 via pin 24. In conventional toggle linkage fashion, force multiplication is achieved as handle 12 is depressed, which causes the line of action from pivot pin 22 through pin 24 along toggle link 20 to approach a straight line as ram 14 is driven toward platen 16.

Figure 2:
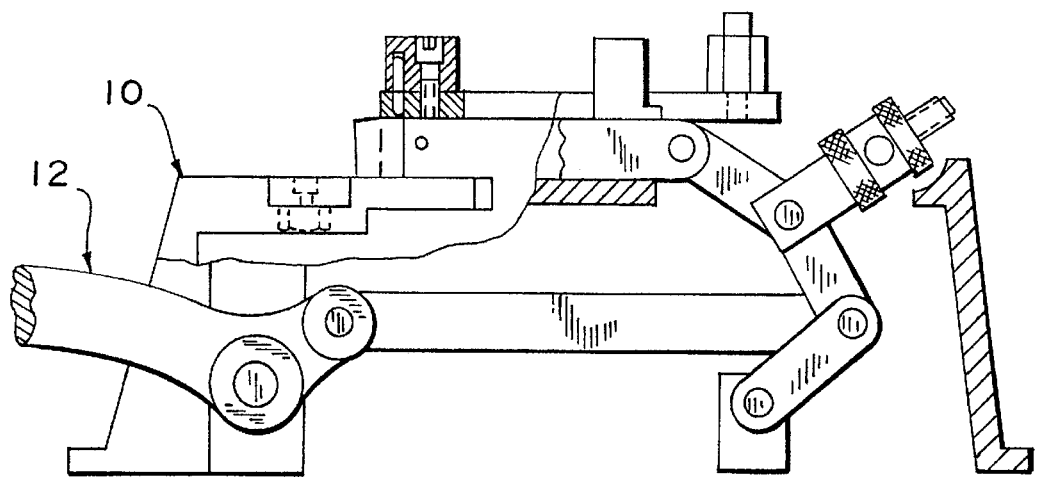
FIG. 2 is a partial side view of a second prior art rule bender.

FIG. 2 is a partial schematic of a second prior art rule bender, which comprises two stages of toggle linkages operating a ram against a platen. In it a handle 12 operates a connecting rod that actuates a first toggle linkage by drawing the center pivot toward a straight line position. This first toggle linkage then pushes center pivot of a second toggle linkage toward a straight line position as the second toggle linkage advances the ram.

Figure 3A:
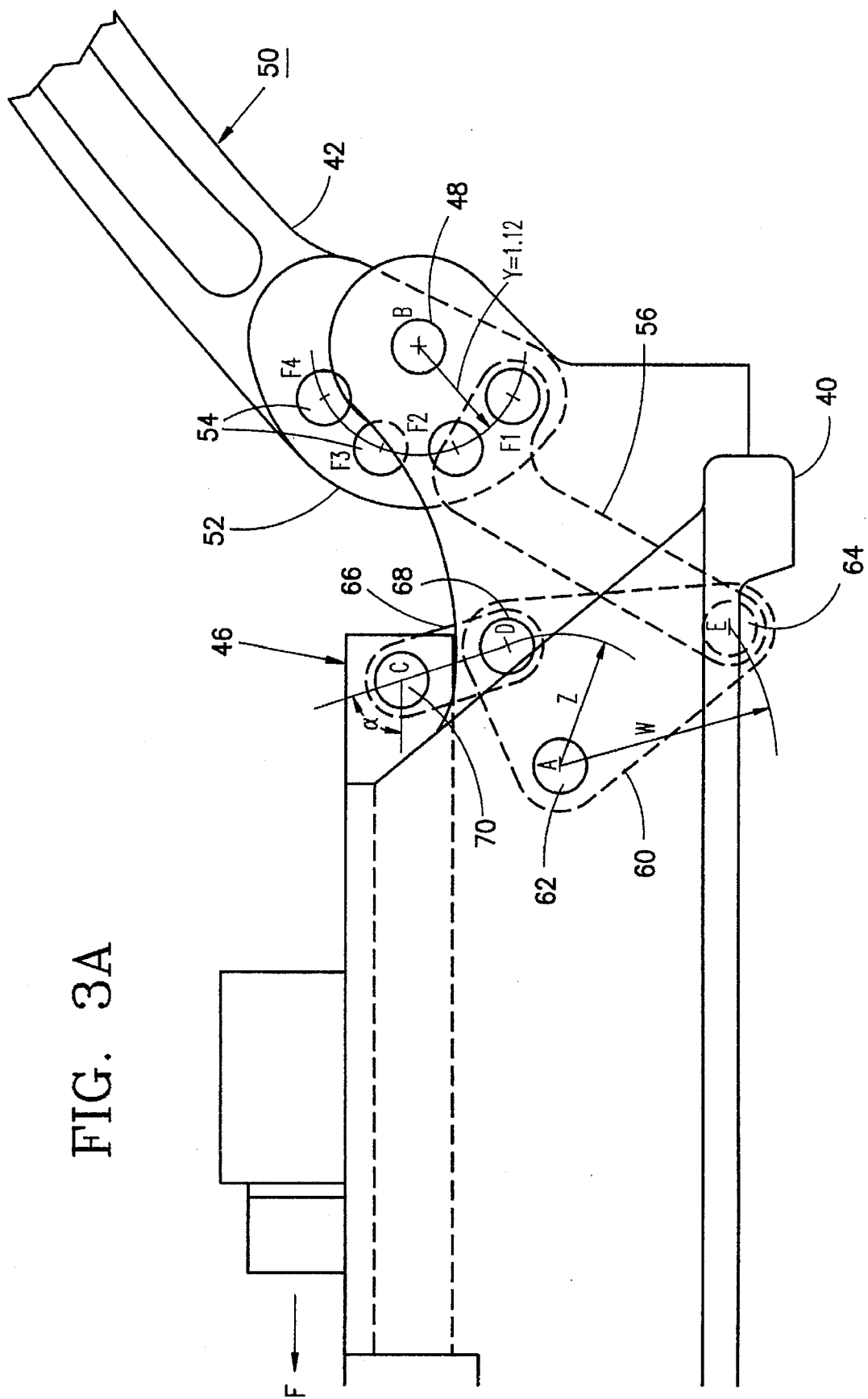
FIG. 3A and 3B are side views of an embodiment of a rule bender according to the present invention.
Figure 3B:
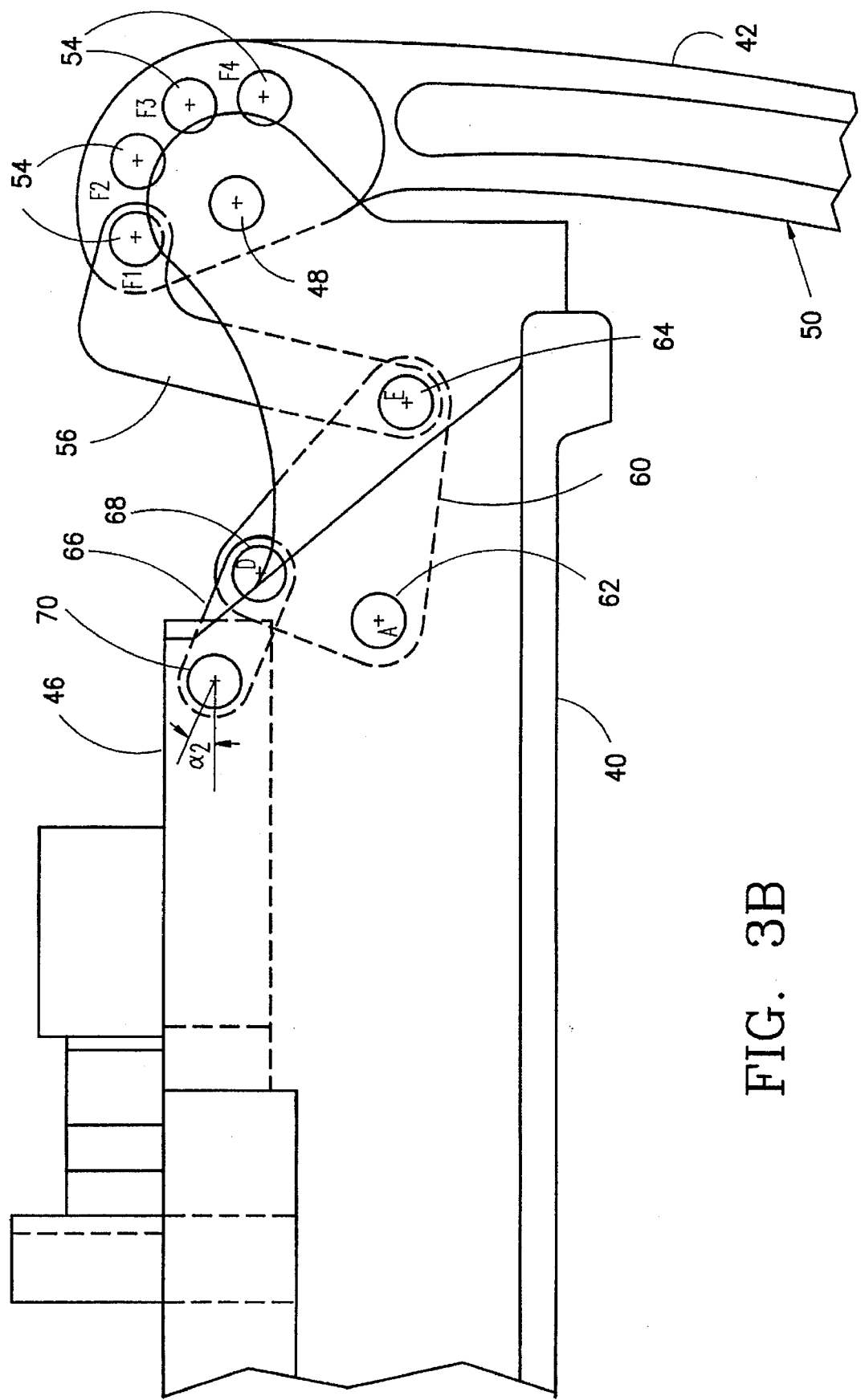

FIG. 3A and 3B are side views of an embodiment of the present invention comprising base 40, handle 42, platen 44 and ram 46, with ram 46 shown in its fully retracted position and fully extended position, respectively. Ram 46 and platen 42 are adapted to receive conventional rule bending dies or, alternatively, a notching knife and die. Handle 42 is preferably a steel stamping or forging pivotally mounted to base 40 by a conventional ball, needle roller, or preferably plain bearing riding on a steel pivot pin 48. Handle 42 has an elongated end 50, preferably about 20 inches long measured from pivot pin 48. Handle 42 further includes a link-pivot end 52 having a plurality of pivot attachment points 54, preferably located at a common radial distance from pivot pin 48. Rotatably attached to one of the pivot attachment points 54 is one end of toggle link 56, which is preferably a high strength steel forging. Toggle link 56 is preferably "L" shaped to allow it to clear pivot pin 48 as handle 42 is rotated through its full range of motion.

The remaining end of toggle link 56 is attached to a rotating link 60 at pivotal attachment 64, which may be a plain or other conventional bearing. Rotating link 60 is preferably a steel stamping or forging that is pivotally attached to base 40 by a conventional ball or preferably plain bearing riding on a steel pivot pin 62. Output link 66 is rotatably attached to a second pivotal attachment 68 on rotating link 60. The remaining end of output link 66 is pivotally attached to ram 46 via pivotal attachment 70 for imparting motion to ram 46 responsive to movement of handle 42.

Rotating link 60 is dimensioned such that the radius from pivot 62 to pivotal attachment 64 is greater than the radius from pivot 62 to pivotal attachment 68 to provide amplification of the force along toggle link 56. The length of toggle link 56 is also selected such that the moment arm between pivotal attachment 64 and pivot 62 measured normal to the line of action along toggle link 56 does not approach zero, that is, the input crank does not substantially approach a top-dead-center condition. At the same time, the toggle joint created by handle 42, toggle link 56, and pivotal attachment 64 begins at a top-dead-center condition, as shown in FIG. 3A, passes through a mid-stroke position and approaches a bottom-dead-center position, as shown in FIG. 3B. The term "mid-stroke" position is used in the same sense as is ordinarily used in describing a reciprocating engine, that is, the line of action along link 56 is at right angles to the line of action between the handle fulcrum 48 and the link pivot 54. Likewise, the length of output link 66 and the location of pivotal attachment 68 are selected such that the moment arm between pivotal attachment 68 and pivot 62 normal to the line of action along output link 66 does not approach zero (top-dead-center). In operation, the force along toggle link 56 is amplified in the manner of a conventional toggle at the beginning and end of the stroke of handle 42. The output of toggle link 56 is then, in an unconventional manner, amplified by the crank-and-pivot mechanism of rotating link 60 to advance or retract ram 46. Because the lengths of the links and the location of the pivots are selected to preclude the rotating pivot from encountering a top-dead-center condition, the amplification provided by the rotating link is relatively linear. Accordingly, adjustments in the output mechanical advantage can be made simply by adjusting the length of the input link and/or the radius of the first pivotal attachment 64.

FIG. 4A–C are schematic diagrams of the major elements of an embodiment of the present invention, the prior art bender of FIG. 1 and the prior art bender of FIG. 2, respectively. Each of the apparatus represented by FIGS. 4A–4C, with the dimensions indicated, were analyzed according to the method of virtual work to determine mechanical advantage (defined as force at the ram divided by torque at the handle pivot) as a function of the stroke of the press ram. Referring to FIG. 4A, a moment ($M_H$) applied at the handle pivot produces a force at point F, which produces an equal and opposite force at point E, the end of toggle link 56. The force at point E produces a moment about pivot A, which produces a force at point D. The force at point D is then reacted at point C, which is the point where output link 66 attaches to ram 46. The force at C is then resolved along the line of action of the ram to produce force F. The apparatus of FIGS. 4B and 4C were similarly analyzed for mechanical advantage, with the input moment represented by $M_H$ and the output force of the ram represented by F in each schematic. The linkage equations resulting from these schematics were programmed into a computer and solved for mechanical advantage as a function of ram stroke.

Figure 5A:
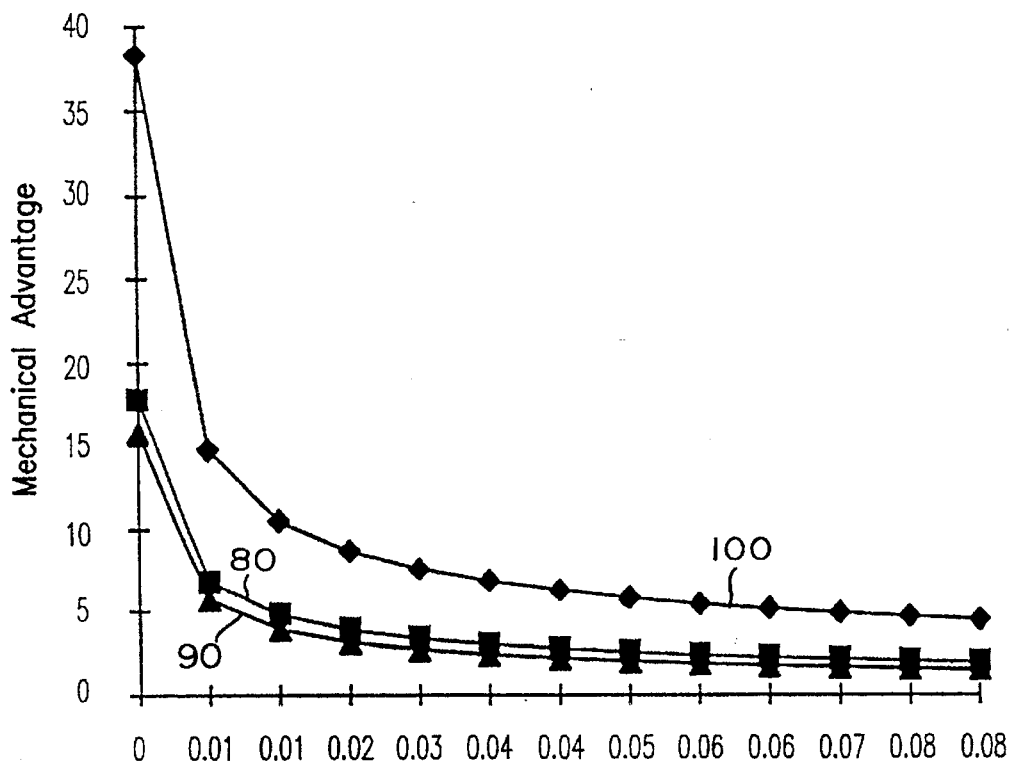
FIG. 5A–C are graphical representations of the mechanical advantage versus ram stroke of an embodiment of the present invention compared with the mechanical advantage of the prior art apparatus.
Figure 5B:
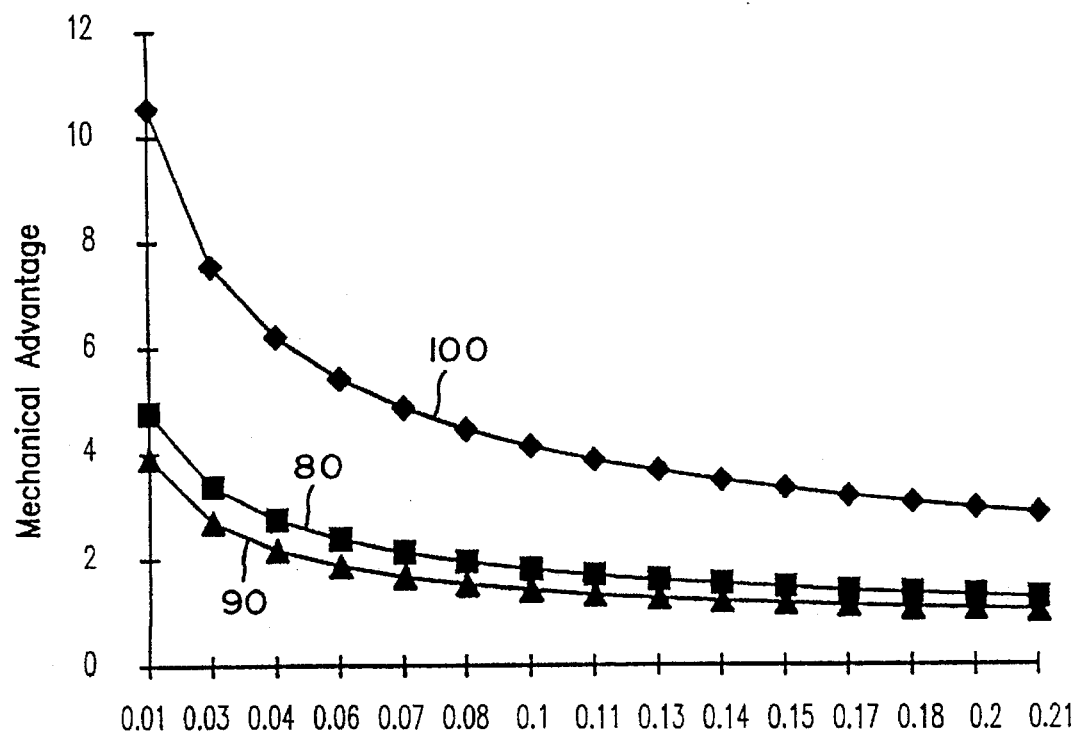
Figure 5C:
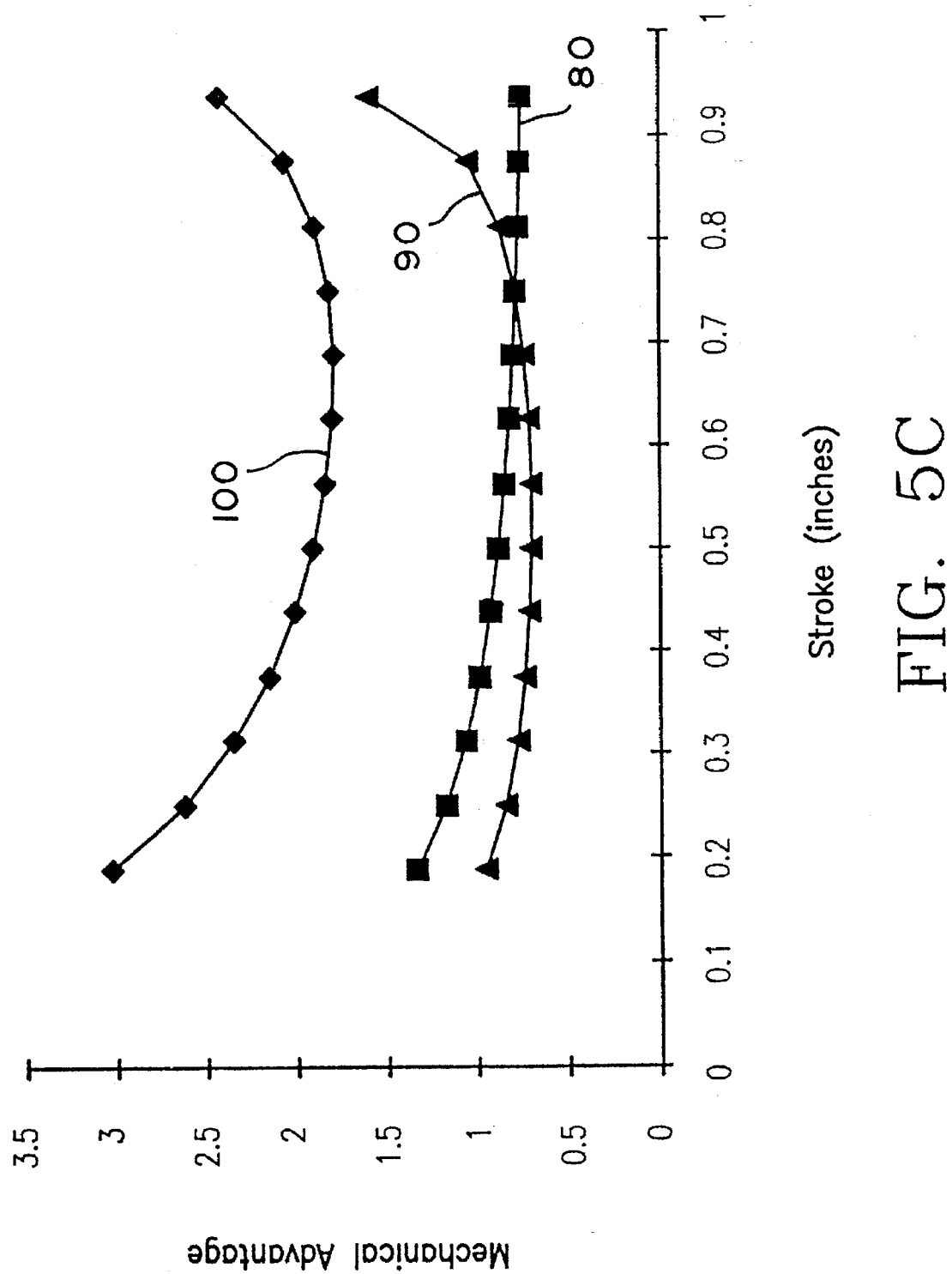

FIGS. 5A–C are graphical representations of mechanical advantage versus ram stroke resulting from the foregoing analysis for strokes of 0.08, 0.21 and 1.0 inch, respectively with the mechanical advantage of the prior art apparatus of FIG. 1 represented by the curve designated 80, the mechanical advantage of the prior art apparatus of FIG. 2 represented by the curve designated 90, and the mechanical advantage of the present invention represented by the curve designated 100. As can be seen from FIGS. 5A–C, the embodiment of the present invention has approximately twice the mechanical advantage as either of the prior art apparatus, including over the critical last ½ inch of stroke. Yet the present invention has substantially fewer parts than the two stage toggle apparatus of the prior art. Moreover, the mechanical advantage of the present invention does not as rise steeply as the ram nears its fully retracted position as does the two stage toggle prior art apparatus. Accordingly, less handle motion is wasted near the beginning of the stroke where the ram is typically unloaded.

What is claimed is:

1. A manually operated press comprising:

a base;

a platen fixed to said base;

a ram attached to said base, said ram being movable toward and away from said platen;

a handle having an elongate grip end and a link-pivot end, said link-pivot end attached to said base through a first rotatable pivot, said link-pivot end further including an input link pivot, said input link pivot being offset radially from said rotatable pivot;

a toggle-and-crank linkage responsive to movement of said handle for extending and retracting said ram relative to said platen, said toggle-and-crank linkage comprising a toggle input link, a rotary member, and an output link, said rotary member having first and second crank pivots and a fixed rotatable fulcrum, said output link having a first and second end, said first end of said output link pivotally attached to said ram and said second end of said output link pivotally attached to said second crank pivot, said toggle input link having first and second ends, said first end of said toggle input link being pivotally attached to said input link pivot, said second end of said toggle input link being pivotally attached to said first crank pivot, said toggle-and-crank linkage being dimensioned such that said toggle input link is substantially at top dead center when said ram is fully retracted from said platen and is substantially at bottom dead center when said ram is fully extended toward said platen.

2. The press of claim 1 wherein said handle is adapted for rotation about said pivot through at least 100 degrees of rotation.

3. The press of claim 1 further including a plurality of input link pivots for adjusting the position of said first toggle link end relative to said handle.

4. The press of claim 1 further including means for adjusting the angular orientation the elongate grip end of said handle relative to said link-pivot end.

5. A manually operated press comprising:

a base;

a platen fixed to said base;

a ram attached to said base, said ram being movable toward and away from said platen; and a toggle linkage comprising:

a handle having an end attached to said base through a first rotatable pivot, the end of said handle having an input link attachment point offset radially from said rotatable pivot;

a rotary member, said rotary member attached to said base through a second rotatable pivot, said rotary member having a first and second crank attachment point, the first and second crank attachment points being offset radially from the second rotatable pivot, with the first crank attachment point being at a greater radius than the second crank attachment point;

an input toggle link having a first and second end, said first end being pivotally attached to said input link attachment point, said second end being attached to said first crank attachment point; and an output link having a proximal and distal end, said proximal end being pivotally attached to said second crank attachment point, said distal end being pivotally attached to said ram;

said toggle linkage being dimensioned such that said input toggle link is substantially at top dead center with respect to said handle when said ram is fully retracted and said input toggle passes through a mid-stroke position as said ram is advanced toward said platen;

whereby motion imparted to said handle is imparted to said input toggle link, which imparts rotary motion to said rotary member, which, in turn, imparts motion to said output link for moving said ram toward and away from said platen.

6. The apparatus of claim 5 wherein said handle is adapted for motion through at least 100 degrees of rotation.

* * * * *